United States Patent [19]
Torii et al.

[11] Patent Number: 5,151,608
[45] Date of Patent: Sep. 29, 1992

US005151608A

[54] OPTICAL DISTANCE SENSOR USING A LASER BEAM AND PROCESSING MEANS

[75] Inventors: Nobutoshi Torii, Hachioji; Hiroshi Wakio, Oshino, both of Japan

[73] Assignee: Fanuc Ltd, Minamitsuru, Japan

[21] Appl. No.: 613,751

[22] PCT Filed: Apr. 18, 1990

[86] PCT No.: PCT/JP90/00505
§ 371 Date: Dec. 11, 1990
§ 102(e) Date: Dec. 11, 1990

[87] PCT Pub. No.: WO90/13001
PCT Pub. Date: Jan. 11, 1990

[30] Foreign Application Priority Data
Apr. 19, 1989 [JP] Japan .................... 1-97383

[51] Int. Cl.⁵ .................... G01N 21/86; G01C 3/00
[52] U.S. Cl. .................... 250/561; 250/201.6; 356/1
[58] Field of Search .................. 250/561, 208.3, 201.6, 250/560, 234–236; 356/375, 4, 1

[56] References Cited
U.S. PATENT DOCUMENTS

| | | | |
|---|---|---|---|
| 4,527,891 | 7/1985 | Lambeth | 356/1 |
| 4,677,302 | 6/1987 | Chiu et al. | 250/561 |
| 4,774,403 | 9/1988 | Arts | 250/561 |
| 4,790,660 | 12/1988 | Ito et al. | 356/376 |
| 4,796,998 | 1/1989 | Soma et al. | 356/1 |
| 4,864,147 | 9/1989 | Ikari et al. | 250/560 |
| 4,878,754 | 11/1989 | Homma et al. | 356/1 |
| 5,015,868 | 5/1991 | Park | 250/561 |

Primary Examiner—David C. Nelms
Assistant Examiner—Michael Messinger
Attorney, Agent, or Firm—Staas & Halsey

[57] ABSTRACT

An optical distance sensor superior in measuring accuracy and simple in construction is mounted to, e.g., a welding torch of an arc welding robot. A laser beam from a laser oscillator (1) is moved on a workpiece (100) in a direction perpendicular to a weld line, with angular movement of a mirror (2). Primary reflected light, secondary reflected light and spatter light, except for arc light intercepted by a filter (5), are incident via a lens (4) on light receiving cells of a light receiving section (3) composed of a one-dimensional charge-coupled device. At scanning of the light receiving section, outputs of the light receiving cells depending on incident light quantities are successively sent, and data specifying those light receiving cells which generate predetermined level outputs are written in one of memory buffers (12, 13). The light-receiving-cell output is applied to a peak detection circuit (18) via an analog switch (17), only when data indicating that the light receiving cell output in the preceding scanning period is at the predetermined level is read from the other memory buffer, to thereby eliminate the spatter light.

9 Claims, 6 Drawing Sheets

OPTICAL DISTANCE SENSOR USING A LASER BEAM AND PROCESSING MEANS

TECHNICAL FIELD

The present invention relates to an optical distance sensor, and more particularly, to a distance sensor which is capable of accurately measuring a distance from a workpiece by the use of a laser beam and which is simple in construction.

BACKGROUND ART

Conventionally, in order to obtain distance information employed for robot control, etc., it has been known to use an optical distance sensor for measuring a distance from a workpiece. This kind of sensor, mounted to, e.g., a welding torch of an arc welding robot, is arranged to project a laser beam onto a workpiece through a mirror which is angularly moved to cause the laser beam to scan the workpiece, and derive a distance between the torch and the workpiece by means of a triangulation method on the basis of an angular movement position of the mirror and an incident position of the laser beam, reflected by the workpiece surface, on a light receiving section of the sensor.

During the distance measurement, a measuring error occurs, if arc light is incident upon the light receiving section. To obviate this, conventionally, a pulsative laser beam (laser pulses) is generated, and contribution of the arc light is removed on the basis of outputs of the light receiving section which are respectively generated when each laser pulse is turned on and turned off. In order to generate the laser pulses, however, a laser-beam demodulator, which is operated in synchronism with a laser-beam modulator, or the like, is required in addition to the laser-beam modulator. Further, the distance sensor of this kind is complicated in circuit arrangement, and is high in cost.

Moreover, since the light receiving section of the conventional distance sensor is composed of a semiconductor position-detection element (hereinafter referred to as PSD) consisting of semiconductor membranes of three uniformly contiguous layers, generally, the light-receiving-element output is extremely small, i.e., in the order of several tens of nA. Thus, an amplifier circuit is inevitably required. Further, this sensor is poor in measurement stability, and makes it difficult to perform steady high-speed scanning. When the strength of the laser beam is so increased as to increase the light-receiving-section output, the human body, particularly, eyes are adversely affected by the laser beam. In case that a laser beam (higher-order reflected light including secondary reflected light) reflected by the workpiece twice or more is incident upon the light receiving section, in addition to a laser beam (primary reflected light) reflected once by the workpiece, an output, which corresponds to an imaginary light receiving position of the composed incident light of the primary reflected light and the higher-order reflected light, is outputted from the conventional light receiving section composed of the PSD. As a result, a measuring error occurs.

DISCLOSURE OF THE INVENTION

It is an object of the present invention to provide an optical distance sensor which is excellent in measuring accuracy and which is simple in construction.

In order to achieve the above-mentioned object, according to the present invention, there is provided an optical distance sensor which comprises a light emitting section for projecting light toward a subject, and a light receiving section for receiving light reflected from the subject, and which is arranged to measure a distance from the subject in accordance with a light receiving position on the light receiving section. The distance sensor comprises the light receiving section having a group of light receiving elements each of which is arranged to generate an output corresponding to an incident light quantity, scanning means for periodically scanning the light receiving section to successively send the outputs from the group of light receiving elements, and peak detection means for detecting a peak of the outputs from the group of light receiving elements.

Preferably, the distance sensor includes a filter disposed in front of the light receiving section for permitting light within a predetermined wavelength band including a wavelength of the projected light to pass therethrough, a mirror interposed between the light emitting section and the subject for angular movement, for causing the projected light to scan the subject, and a lens interposed between the light receiving section and the filter for condensing the reflected light from the subject. Preferably, the light emitting section includes a laser oscillator for generating a laser beam, and the light receiving section is composed of a solid-state image pickup device, i.e., a charge-coupled device or the like. Preferably, the distance sensor includes switch means interposed between the light receiving section and the peak detection means, for applying, to the peak detection means, an output only from that light receiving element which has generated, in at least one light-receiving-section scanning period preceding a current light-receiving-section scanning period, an output higher than a predetermined value. Preferably, the optical distance sensor is mounted to a welding torch of an arc welding robot.

As described above, according to the present invention, since the light receiving section, having the group of light receiving elements which are preferably composed of the solid-state image pickup devices for generating outputs corresponding to incident light quantities, respectively, is periodically scanned to successively deliver the light-receiving-element-group outputs, and since the peak of the light-receiving-element-group outputs is detected, it is possible to detect the incident position of the primary reflected light, reflected from the subject, on the light receiving section, in such a manner that it is distinguished from the incident position of the higher-order reflected light, particularly, from that of the secondary reflected light. Thus, the distance sensor is excellent in measuring accuracy.

Preferably, since the light falling outside the predetermined wavelength band is prevented by the filter from being incident on the light receiving section, it is possible to remove bad influence of the light other than the reflected light, without the need of using modulated projecting light. Thus, modulation and demodulation circuits are unnecessary, making it possible to simplify the construction of the distance sensor. Preferably, the laser beam is used as the projecting light by which the subject is scanned through the mirror, and the reflected light is condensed by the lens. This makes it possible to positively perform the distance measurement, and determine a cross-sectional configuration image of the subject surface. Moreover, preferably, the outputs only from those light receiving elements which have generated, in at least one scanning period previous to the last scanning period, the outputs higher than the predetermined value are applied to the peak detection means. Accordingly, it is possible to remove bad influence of the light, other than the reflected light, whose duration is short or whose incident position on the light receiving section varies. In the case of mounting the distance sensor to the welding torch of the arc welding robot, distance information for robot control can be correctly and easily obtained.

Best Mode of Carrying Out the Invention

Figure 4:
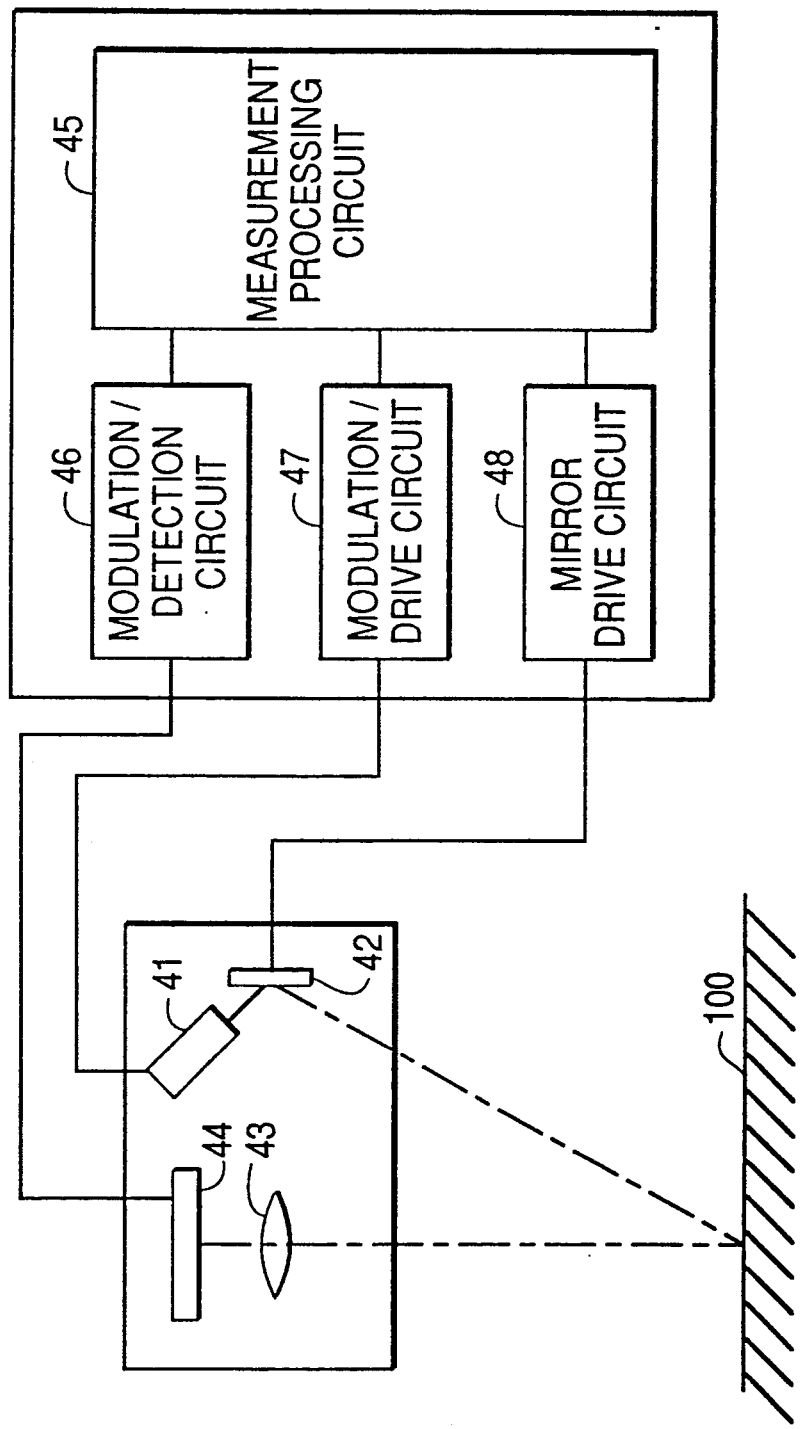
FIG. 4 is a schematic view showing a conventional distance sensor.

Referring to FIG. 4, a conventional distance sensor, mounted to a welding torch of an arc welding robot, is provided with a laser oscillator 41 for projecting a pulsative laser beam, modulated by frequency not less than several tens of KHz by a modulation/drive circuit 47, toward a workpiece 100 through a mirror 42. The laser beam scans the workpiece 100 in a direction perpendicular to a workpiece groove line (weld line), not shown, during angular movement of the mirror 42 driven by a mirror drive circuit 48. The laser beam reflected by the workpiece surface is incident on a light receiving section 44 consisting of PSD, through a lens 43. Meanwhile, during arc welding, arc light and light (hereinafter referred to as spatter light) having a short duration and generated upon occurrence of spatter, generated at random, are also incident on the light receiving section 44. A demodulation/detection circuit 46, which is operated in synchronism with the modulation/drive circuit 47, determines the difference (contribution of the arc light) between an electric output signal from the light receiving section 44 at turning-on of the laser pulse and the electric output signal at turning-off of the laser pulse, to remove the contribution of the arc light from the electric output signal, thereby generating an output representative of a laser-beam incident position on the light receiving section 44. A measurement processing circuit 45 derives the distance between the distance sensor (welding torch) and the workpiece 100 by means of a triangulation method, on the basis of an output from the demodulation/detection circuit 46 and an output from the mirror drive circuit 48 representative of the mirror angular-movement angle. As described above, however, the distance sensor illustrated in FIG. 4 is complicated in circuit arrangement and is high in cost. Further, the output from the light receiving section is extremely small so that unstable measurement is liable to occur, and measuring errors due to the presence of higher-order reflecting light are apt to occur.

Figure 5:
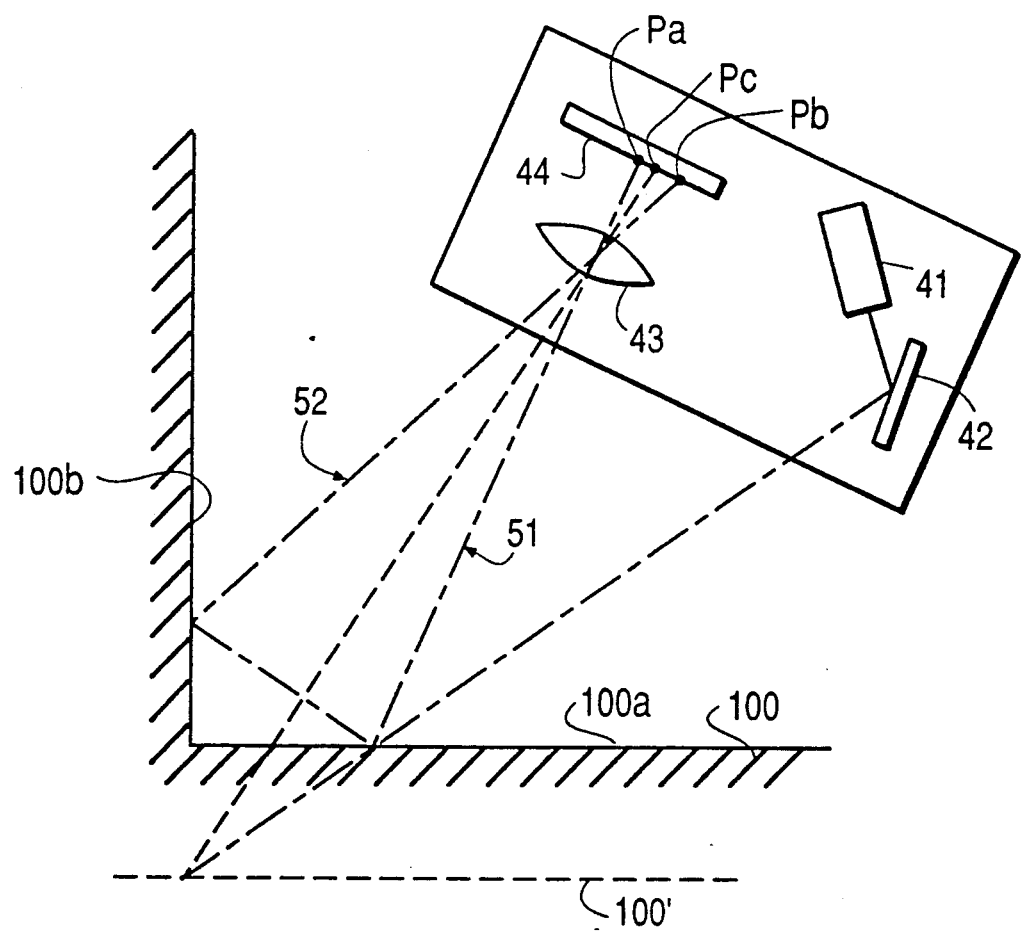
FIG. 5 is a view of explanation of a cause of a measuring error in the distance sensor illustrated in FIG. 4.

In the following, the cause of measuring errors will be described. For example, the laser beam projected toward the workpiece 100 from the laser oscillator 41 through the mirror 42 is reflected by a workpiece surface 100a, as shown in FIG. 5. Part (primary reflected light 51) of the reflected light is incident upon a first position Pa on the light receiving section 44, through the lens 43, and part (secondary reflected light 52) of the remaining laser beam reflected by the workpiece surface 100a is reflected by another workpiece surface 100b, and is then incident upon a second position Pb on the light receiving section 44. In this case, the output from the light receiving section 44 represents the combined light of the primary reflected light 51 and the secondary reflected light 52. After all, it is misunderstood that the workpiece 100 is disposed at that position 100', which corresponds to an imaginary incident position Pc of the combined reflected light on the light receiving section 44.

Figure 1:
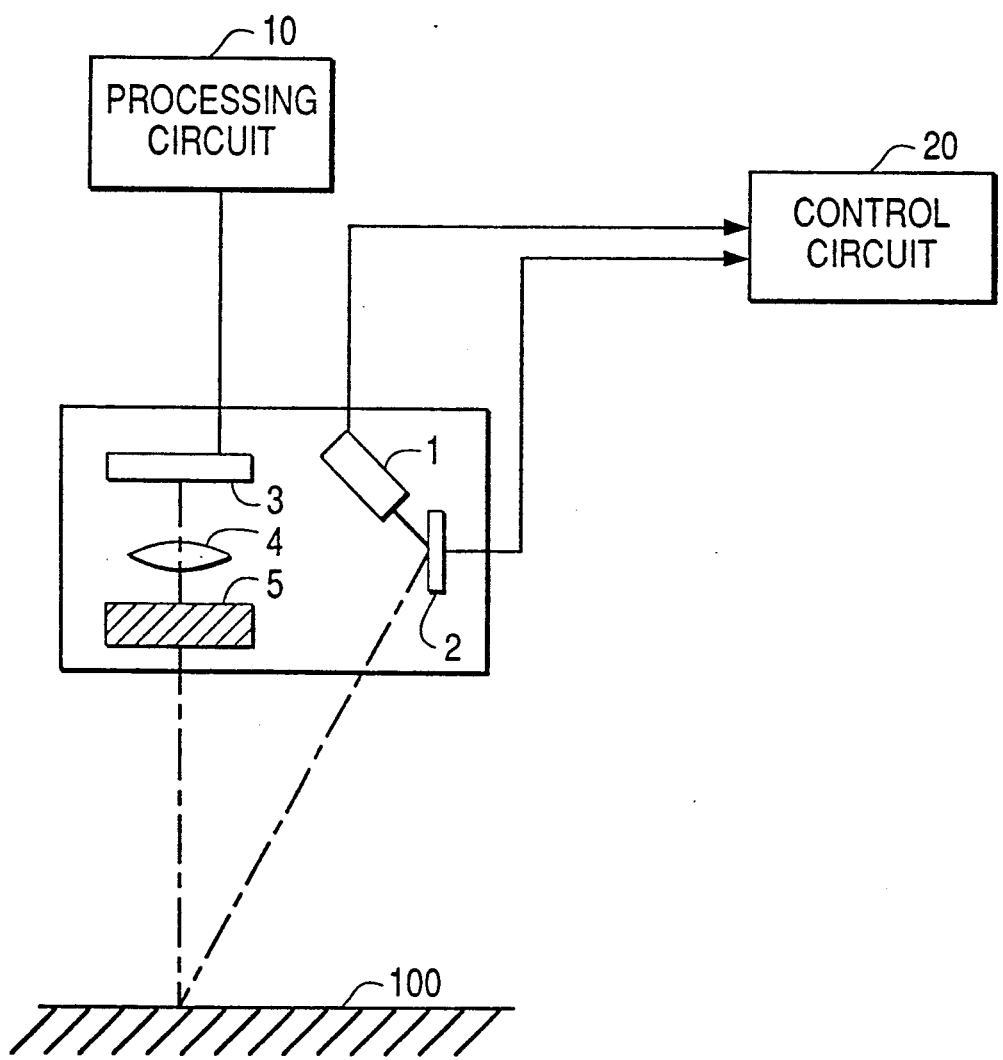
FIG. 1 is a schematic view showing a light emitting section and a light receiving section of a distance sensor according to an embodiment of the present invention.
Figure 2:
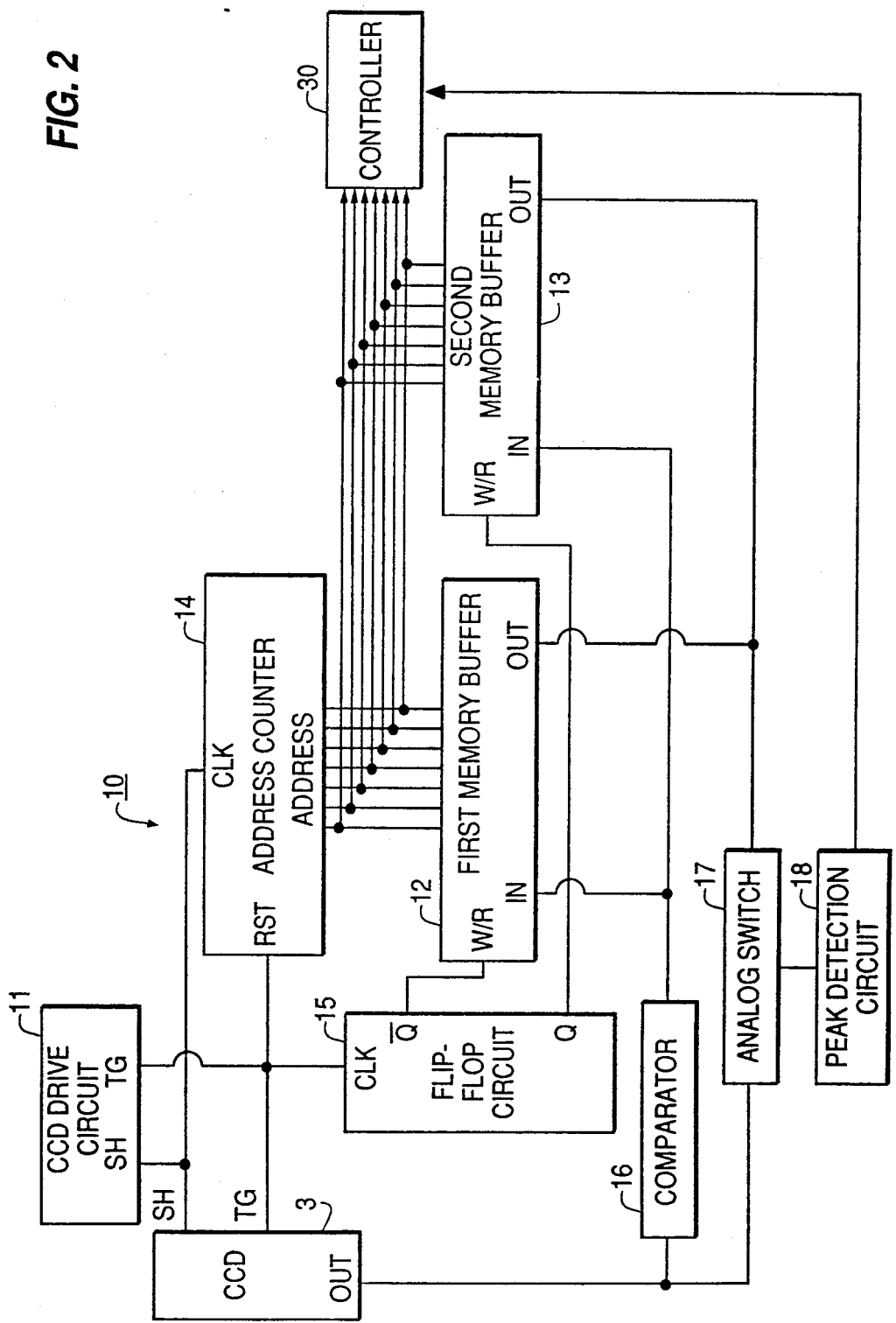
FIG. 2 is a schematic block diagram showing a processing circuit section which cooperates with the light emitting and receiving sections illustrated in FIG. 1 to form the distance sensor.

With reference to FIGS. 1 and 2, a distance sensor, according to an embodiment of the present invention, which is mounted to the welding torch of the arc welding robot, will be described.

The distance sensor is provided with a light emitting section for projecting a laser beam toward the workpiece 100, a light receiving section for receiving a reflected light beam from the workpiece 100, and a control circuit 20. The light emitting section has a laser oscillator 1 connected to an oscillator drive circuit (not shown) of the control circuit 20 for generating a laser beam, and a mirror 2 connected to a mirror drive circuit (not shown) of the control circuit 20 and arranged for angular movement. The light receiving section has a group of light receiving elements 3 disposed in alignment with each other, a lens 4 disposed in front of the group of light receiving elements 3 for condensing the incident light, and an interference filter 5 disposed in front of the lens 4 for permitting those light beams alone, which have wavelengths falling within a predetermined band including a wavelength of the laser beam, to pass through the filter. Preferably, the group of light receiving elements 3 is composed of one-dimensional solid-state image pickup elements such as one-dimensional charge-coupled devices. Hereinafter, the group of light receiving elements and each light receiving element will be referred to as CCD and CCD cell, respectively.

The distance sensor further includes a processing circuit 10 (FIG. 2). The processing circuit 10 includes a CCD drive circuit 11 for controlling output operation of the CCD 3, first and second memory buffers 12 and 13 each having address regions whose number is not less than the number of CCD cells, an address counter 14 for specifying an arbitrary one of the address regions of each of the memory buffers, and a flip-flop circuit 15 for controlling write/read operations of the memory buffers 12, 13.

More specifically, in order to control the CCD output operation, the CCD drive circuit 11 is arranged to generate a scanning start signal TG at intervals of a first predetermined period and generate a sample hold signal SH at intervals of a second predetermined period shorter than the first predetermined period. A TG-signal output terminal of the circuit 11 is connected to a TG signal input terminal of the CCD 3, a reset-signal input terminal RST of the address counter 14, and a clock-signal input terminal CLK of the flip-flop circuit 15. An SH-signal output terminal of the circuit 11 is connected to an SH-signal input terminal of the CCD 3, and a clock-signal input terminal CLK of the address counter 14. The first and second memory buffers 12, 13 are connected to the address counter 14 through address buses. Further, a reset output terminal $\overline{Q}$, and a set output terminal Q of the flip-flop circuit 15 are respectively connected to write/read-condition control-signal input terminals W/R of the memory buffers 12 and 13, so that one of the memory buffers is in a write state when the other is in a read state.

The processing circuit 10 further includes a comparator 16 for comparing the output signal from the CCD 3 with a reference value generated within the comparator, an analog switch 17 for connecting and disconnecting the CCD output signal in accordance with the level of an associated one of the memory buffer outputs, and a circuit 18 for detecting a peak of the CCD output applied through the analog switch. Specifically, the output terminal OUT of the CCD 3 is connected to an input terminal of the comparator 16 and a data input terminal of the analog switch 17. An output terminal of the comparator 16 is connected to data input terminals IN of the first and second memory buffers 12 and 13, and a control-signal input terminal of the analog switch 17 is connected to data output terminals OUT of these memory buffers. Further, an input terminal of the peak detection circuit 18 is connected to an output terminal of the analog switch 17, and an output terminal and an address bus of the circuit 18 are connected to a controller 30 mounted on the welding robot for controlling drive of various operating sections of the robot.

In the following, operation of the distance sensor illustrated in FIGS. 1 and 2 will be described.

Figure 3:
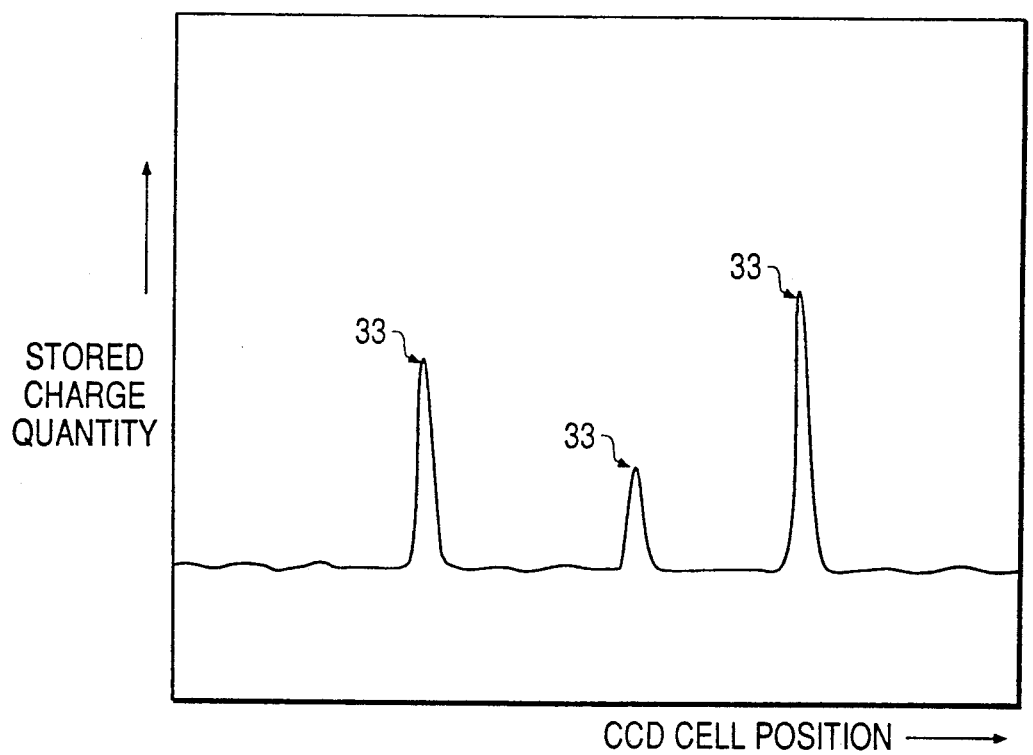
FIG. 3 is a view showing, by way of example, an output pattern from the light receiving section illustrated in FIG. 1.

When the laser oscillator 1 and the mirror 2 are operated under the control of the control circuit 20, the laser beam generated by the laser oscillator 1 is projected onto the mirror 2. The laser beam reflected by the mirror 2 scans the workpiece 100 in a direction perpendicular to the weld line on the workpiece 100 during angular movement of the mirror 2. The laser beam is reflected by the workpiece surface, so that the primary reflected light and the higher-order reflected light including the secondary reflected light are generated, as explained above. Further, arc light and spatter light are generated during the arc welding. When these kinds of light reach the interference filter 5, the arc light is intercepted by the filter 5, while the primary reflected light, the higher-order reflected light and the spatter light are permitted to pass through the filter 5 to reach the CCD 3 through the lens 4. An electric charge corresponding to a quantity of light received by each of the CCD cells is stored in each CCD cell. FIG. 3 illustrates, by way of example, an electric charge storage pattern, with positions of these CCD cells on the CCD 3 taken on the abscissa, and with the stored charge quantities of the CCD cells taken on the ordinate. In FIG. 3, reference numerals 31-33 correspond to the primary reflected light, the secondary reflected light and the spatter light, respectively. Meanwhile, the strength of the higher-order reflected light other than the secondary reflected light is generally small.

During the light receiving operation of the CCD 3, the CCD drive circuit 10 generates the scanning start signal TG and the sample hold signal SH at intervals of the first and second predetermined periods, respectively. Here, the first predetermined period is set to 1/300 to 1/200 times a period (mirror angular-movement period) required for the mirror 2 angularly moving from the minimum angular-movement angle to the maximum angular-movement angle.

In response to the scanning start signal TG, the address counter 14 is caused to be reset, and the levels of the set output Q and the reset signal $\overline{Q}$ of the flip-flop circuit 15 are inverted, so that the first and second memory buffers 12, 13 are respectively brought into writable and readable states, for instance. The CCD 3 receiving the scanning start signal TG performs a charge-transfer (scanning) operation each time the CCD 3 receives the sample hold signal SH. That is, the electric charge stored in each of the CCD cells is transferred to the adjacent CCD cell on the side of the CCD output terminal, and the charges stored in the CCD cells are successively sent from the CCD 3 to the comparator 16 and the analog switch 17.

The comparator 16 compares the output from the CCD 3 with the reference value, which is set to, e.g., a value larger than the CCD output corresponding to the higher-order reflected light other than the secondary reflected light and which is generated within the comparator, and delivers a binary output in accordance with the comparing results. The comparator binary output assumes a High level "1" when the CCD output is larger than the reference value, and assumes a Low level "0" when the CCD output is smaller than the reference value. The binary output from the comparator 16 is stored in that address region of the one memory buffer (here, the first memory buffer 12) which is specified by the address output from the address counter 14 incremented each time the sample hold signal SH is supplied.

At this time, the same address output is applied to the other (second) memory buffer 13, so that the binary output, which has been written in the preceding CCD scanning period to the address region in a manner explained above, is read out from the address region of the second memory buffer specified by this address output. The analog switch 17 is opened and closed in response to the binary output. That is, the analog switch 17 is closed when the binary data read out from the second memory buffer is at the High level, so that the output from the CCD 3 is applied to the peak detection circuit 18 through the analog switch. On the other hand, when the binary data is at the Low level, the CCD output is prevented from being applied to the circuit 18. After all, only the outputs from those CCD cells which have generated outputs equal to or larger than a predetermined value in the preceding CCD scanning period are applied to the peak detection circuit 18. As a result, the higher-order reflected light other than the secondary reflected light is removed.

As described above, the CCD-output scanning operation is repeated at intervals of the short period which is 1/300 to 1/200 times the mirror angular-movement period. In other words, the CCD scanning with respect to the entire CCD cells is carried out at least twice, while the reflected laser beam is moved between adjacent ones of the CCD cells with the angular movement of the mirror. The CCD scanning operation is done at a high speed in this manner, whereas the spatter light is short in duration and its incident position onto the CCD 3 varies. Thus, in general, there is an extremely low probability that the spatter light was incident, in the preceding period, upon that CCD cell which receives the spatter light in the current CCD scanning period. Hence, the output from the CCD cell in the preceding period is normally less than the predetermined value. In this case, the analog switch 17 is opened to cause the CCD cell output corresponding to the spatter light to be intercepted. Further, in the current period, the output from the CCD cell upon which the spatter light was incident in the preceding period is surely applied to the peak detection circuit 18. For the reasons discussed above, however, there is an extremely low probability that the spatter light is incident upon the same CCD cell during the current period. Hence, in general, the CCD cell output in the current period never be detected as a peak value in the peak detection circuit 18. After all, the spatter light which adversely affects the distance measuring accuracy is removed by the CCD-output intermittent operation of the analog switch 17.

On the other hand, since the mirror angular movement is performed at an extremely low speed, as compared with the CCD scanning, those components of each of the primary reflected light and the secondary reflected light which are in the vicinity of its peak value are incident upon the same CCD in both of adjacent ones of the CCD scanning periods. As a result, the CCD-cell output corresponding to the components of each of the primary reflected light and the secondary reflected light in the vicinity of the peak value are not intercepted by the analog switch 17, so that these components are provided for the peak detection in the peak detection circuit 18.

In this manner, the CCD scanning is repeated 200 to 300 times, while the mirror 2 is moved angularly from the minimum angular-movement angle position to the maximum angular-movement angle position, i.e., while the laser beam scans the workpiece 100 over a predetermined distance in one direction perpendicular to the weld line.

In each of the CCD scanning periods, the peak detection circuit 18 sends, to the controller 30, the peak output from the CCD 3 at the time the CCD output turns from the increase to the decrease. In response to this, the controller 30 reads out two peak outputs respectively corresponding to the peak values of the primary reflected light and the secondary reflected light, and reads out two address counter outputs (CCD-cell positions) specifying two CCD cells from which the peak values of the primary reflected light and the secondary reflected light are generated, respectively. The controller 30 calculates the distance between the distance sensor (welding torch) and the workpiece by means of the triangulation method, on the basis of the mirror angular-movement angle and the CCD-cell position upon which the primary reflected light is incident in each CCD scanning period. The distance calculation is repeated over one mirror angular-movement period, whereby an image representative of a workpiece groove cross-sectional configuration is determined.

Further, every time each CCD scanning operation is completed and the subsequent scanning start signal TG is generated, the address counter 14 is caused to be reset, and the operation mode of one of the first and second memory buffers 12, 13 is switched from the write state to the readout state, while the other memory buffer is switched from the readout state to the write state, as explained above. The operation of the distance sensor in this case will be apparent from the foregoing description, and hence explanations thereof will be omitted.

Subsequently, the mirror 2 is moved angularly from the maximum angular-movement angle position to the minimum angular-movement angle position, and the laser beam scans the workpiece 100 in a direction opposite to that in the aforementioned case. During the scanning, the distance sensor operates in a manner similar to the aforesaid case.

The present invention is not limited to the foregoing embodiment, and various modifications thereof may be made.

Figure 6:
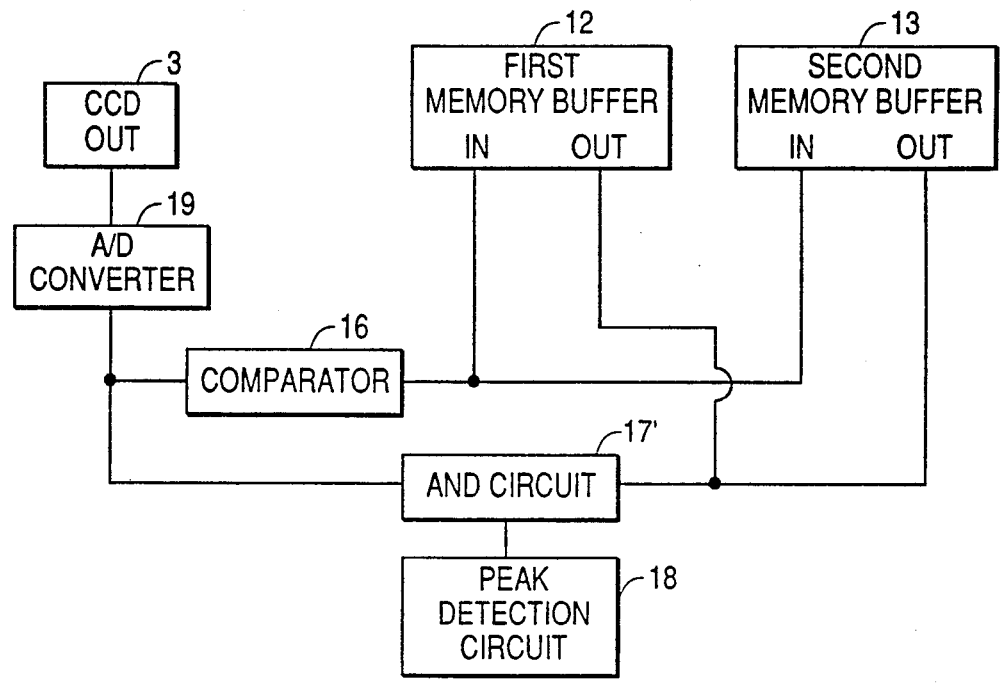
FIG. 6 is a fragmentary block diagram showing a first modification of the processing circuit section illustrated in FIG. 2.
Figure 7:
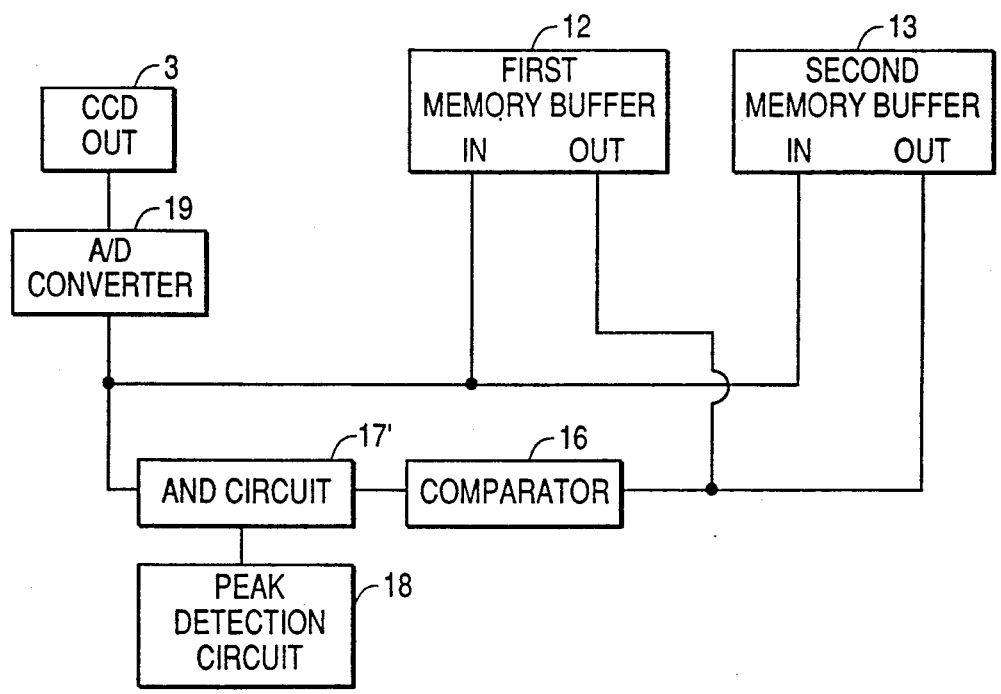
FIG. 7 is a fragmentary block diagram showing a second modification of the processing circuit section.

For example, although the analog output from the CCD 3 is supplied to the comparator 16 and the analog switch 17 in the embodiment, the CCD output may be converted into a digital signal in an A/D converter 19, so that the digital signal is supplied to the comparator 16 and an AND circuit 17', as shown in FIG. 6. The AND circuit 17', which is employed in place of the analog switch 17 in FIG. 2, operates to permit an A/D-converter output corresponding to the CCD output to pass therethrough when the output from the first or second memory buffer 12 or 13 is at a High level, while it prevents the A/D converter output from passing therethrough when the memory buffer output is at a Low level. In the meantime, other elements (not shown) in the modification shown in FIG. 6 correspond to the elements in FIG. 2, and the elements are connected with each other as in the case shown in FIG. 2. Further, the circuit shown in FIG. 6 may be modified as shown in FIG. 7.

In the embodiment, the two memory buffers 12, 13 are employed so that the peak detection is carried out only on the basis of the outputs from those CCD cells from which outputs equal to or higher than the predetermined level were generated in the preceding CCD scanning period. However, three or more memory buffers may be provided so that the peak of the CCD output is detected on the basis of the outputs from those CCD cells which generated outputs equal to or higher than the predetermined level both at two or more scanning periods preceding the current scanning period.

Furthermore, in the embodiment, the analog switch 17 is on-off controlled in accordance with the memory buffer output. However, the on-off control of the analog switch 17 may be carried out in accordance with a logical product signal of the memory buffer output and the comparator output. In this case, the peak detection is performed on the basis of the current outputs from these CCD cells which generated outputs equal to or higher than the predetermined level both at the preceding and current CCD scanning periods.

Further, in the embodiment, the address output from the address counter 14 is referred to for discriminating the position of the CCD cell which generated the peak output. However, a signal equivalent to the address output may be generated in the controller 30 on the basis of the scanning start signal TG and the sample hold signal SH from the CCD drive circuit 11.

We claim:

1. An optical distance sensor having a light emitting section for projecting light toward a subject, and a light receiving section for receiving light reflected from the subject, and arranged to measure a distance from the subject in accordance with a light receiving position on the light receiving section, said optical distance sensor comprising:

said light receiving section having a group of light receiving elements each of which is arranged to generate an output corresponding to an incident light quantity;

scanning means for periodically scanning said light receiving section to successively send said outputs from said group of light receiving elements;

peak detection means for detecting a peak of the outputs from said group of light receiving elements;

processing means, said processing means comprising:

a CCD drive circuit, operatively connected to said light receiving section, controlling the output operation of said light receiving section by generating a scanning start signal at intervals having a first predetermined period and by generating a sample/hold signal at intervals having a second predetermined period shorter than the first predetermined period;

comparator means for comparing an output from one of said light receiving elements with a reference value generated within said comparator means;

first and second memory buffers each having address regions, the number of said address regions being equal to or greater than the number of said light receiving elements;

an address counter circuit, operatively connected to said CCD drive circuit, said light receiving section and said first and second memory buffers, for specifying an arbitrary one of said address regions of each of said memory buffers; and a flip-flop circuit, operatively connected to said first and second memory buffers and said CCD drive circuit, for controlling write/read operations of said first and second memory buffers.

2. An optical distance sensor according to claim 1, further including:

a filter disposed in front of said light receiving section for permitting light within a predetermined wavelength band including a wavelength of the projected light to pass therethrough.

3. An optical distance sensor according to claim 1, further including:

a mirror interposed between said light emitting section and the subject for angular movement, for causing the projected light to scan the subject.

4. An optical distance sensor according to claim 1, further including:

a lens interposed between said light receiving section and said filter for condensing the reflected light from the subject.

5. An optical distance sensor according to claim 1, wherein said light emitting section includes a laser oscillator for generating a laser beam.

6. An optical distance sensor according to claim 1, wherein said light receiving section is composed of a solid-state image pickup device.

7. An optical distance sensor according to claim 6, wherein said solid-state image pickup device is composed of a charge-coupled device.

8. An optical distance sensor according to claim 1, further including:

switch means interposed between said light receiving section and said peak detection means, for applying, to said peak detection means, an output only from that light receiving element which has generated, in at least one light-receiving section scanning period preceding a current light-receiving section scanning period, an output higher than a predetermined value.

9. An optical distance sensor according to claim 1, wherein said optical distance sensor is mounted to a welding torch of an arc welding robot.

* * * * *

UNITED STATES PATENT AND TRADEMARK OFFICE
CERTIFICATE OF CORRECTION

PATENT NO.  : 5,151,608
DATED       : SEPTEMBER 29, 1992
INVENTOR(S) : NOBUTOSHI TORII ET AL.

It is certified that error appears in the above-identified patent and that said Letters Patent is hereby corrected as shown below:

On title page: [57] ABSTRACT, after line 21, insert the following:

--A robot controller (30) responsive to the peak detection circuit output discriminates, on the basis of an address counter (14) output, a position of that light receiving cell on the light receiving section which generates the peak output, and calculates distance from the workpiece by a triangulation method based on the cell position and the mirror angular-movement angle.--.

Signed and Sealed this

Twenty-sixth Day of October, 1993

Attest:

BRUCE LEHMAN

*Attesting Officer*   *Commissioner of Patents and Trademarks*